United States Patent Office 3,332,823
Patented July 25, 1967

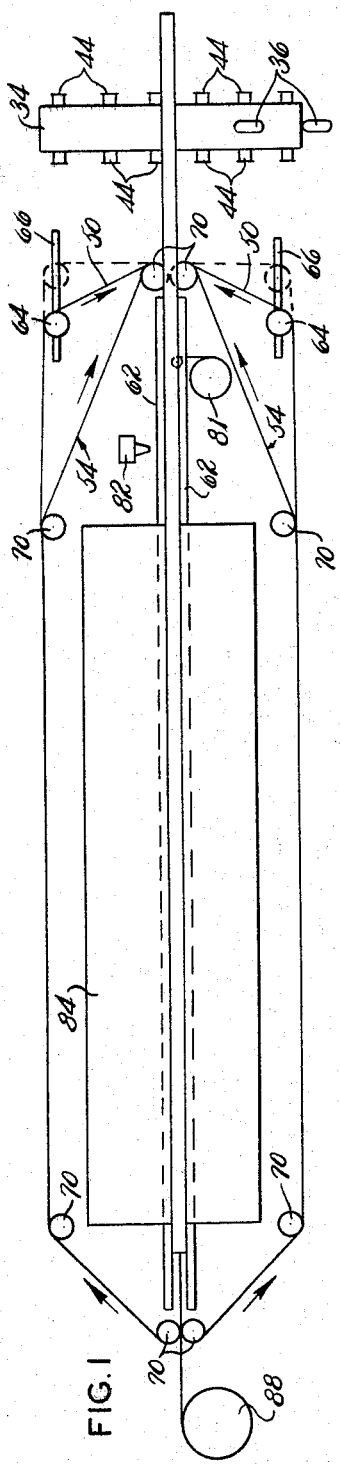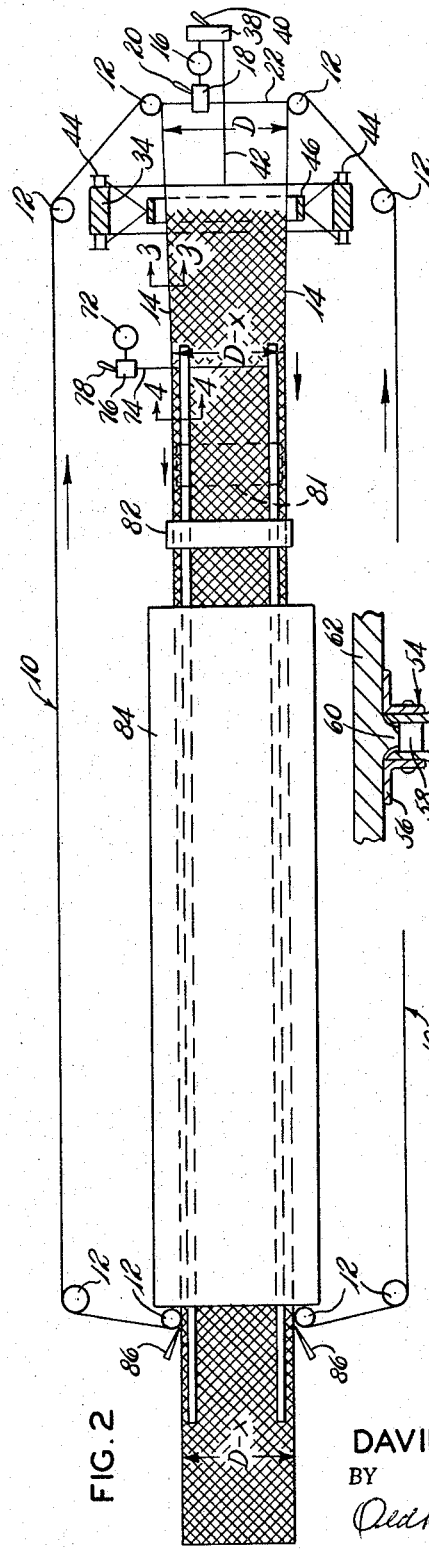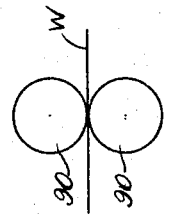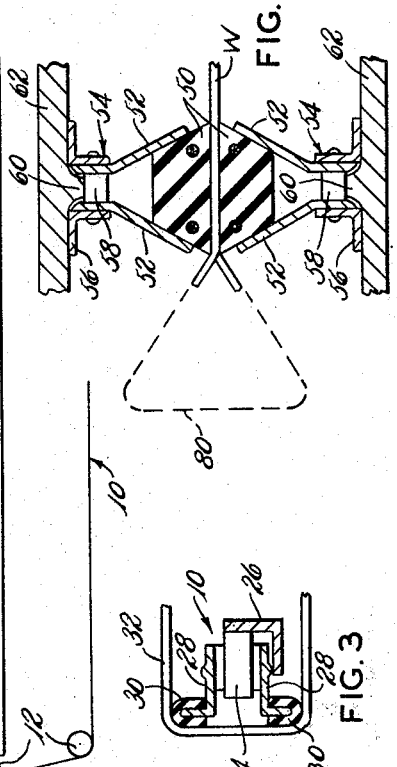
INVENTOR
DAVID W. VAN NESS
BY
Oldham & Oldham
ATTYS.

3,332,823
APPARATUS FOR MAKING PLASTIC WEBS REINFORCED WITH ANGULARLY DIRECTED STRANDS
David W. Van Ness, Oakland, N.J., assignor, by mesne assignments, to Stauffer Chemical Company, New York, N.Y., a corporation of Delaware
Filed Aug. 7, 1964, Ser. No. 388,232
7 Claims. (Cl. 156—427)

ABSTRACT OF THE DISCLOSURE

A pair of endless carriers having opposed substantially parallel reaches is provided and strands are wound around such parallel reaches to provide two layers of strands. Endless belt type means grip the strands and form them into a plane-like web over the area between the gripping means. The endless gripping means move with the strands and the carrier means for the strands are moved closer together to allow the gripping means to convert two layers of strands into a plane-like web. The strands then are connected together and released from the carriers and the gripping means.

---

This invention relates to apparatus for making webs reinforced with angularly directed strands.

It is the general object of the present invention to provide relatively inexpensive, readily operated apparatus for rapidly and efficiently producing webs of angularly directed strands of flexible high strength material such as fiberglass, nylon, polyvinyl chloride, and the like.

Another object of the invention is the provision of apparatus of the type described in which strands are wound helically upon advancing parallel carriers to form a relatively flat helix of strands, and including means for flattening the helix between the carriers while still extending therearound to form a plane-like web of strands, means for connecting the strands in the web, and means for removing the web from the carriers.

Another object of the invention is the provision of apparatus for making strand reinforced webs and including the combination of endless carriers about which the strands are wound helically, and a double pair of endless V-belts, each pair of V-belts being adapted to grip the strands just inside the carriers to flatten the strands between the carriers into a plane-like web, the web then being subjected to further treatment in the apparatus.

Another object of the invention is the provision of apparatus as described in which the means for flattening the helically wound strands include a double pair of endless V-belts, each pair of belts being adapted to grip the strands near the carriers, and the belts being supported by chains having V-shaped members on each chain link, and the chains in turn rolling upon fixed guides.

The foregoing objects of the invention, and other objects which will become apparent as the description proceeds are achieved by the provision of apparatus for making webs reinforced with angularly directed strands including a pair of substantially parallel carriers, means for advancing the carriers, means for helically winding strands around the carriers to form a flat helix of strands, flattening means adjacent the carriers for forming the helix between the flattening means into a plane-like web of strands with the strands at the edges of the web still extending around the carriers, means for connecting the strands in the web, means for removing the web from the carriers, and means for winding up the web.

For a better understanding of the invention reference should be had to the accompanying drawings wherein:

FIGURE 1 is a side elevation of apparatus incorporating the principles of the invention;

FIGURE 2 is a plan view of the apparatus of FIGURE 1;

FIGURE 3 is an enlarged fragmentary cross sectional view taken substantially on line 3—3 of FIGURE 2;

FIGURE 4 is an enlarged fragmentary cross sectional view taken substantially on line 4—4 of FIGURE 2; and FIGURE 5 is a side elevation of a pair of heated rolls engaging opposite sides of the web and constituting a modification of a portion of the apparatus.

In the drawings, the numeral 10 indicates generally a pair of endless carriers, such as chains positioned upon suitable rotary support means 12 to position portions of the carriers with substantially parallel reaches 14. As best seen in FIGURE 2, the reaches 14 of the carriers 10 are positioned apart a distance D at the right hand end of this figure and a distance apart $D-x$ at some distance downstream in the direction of movement of the carriers 10, with the distance $D-x$ being then maintained through the remainder of the apparatus. The carriers 10 are driven at an adjustable speed in the direction of the arrows by means of a motor 16 operating through a gear box 18 having a speed control handle 20 thereon and driving a shaft 22 connected to drive each of the carriers 10.

FIGURE 3 illustrates in somewhat greater detail that each carrier 10 constitutes a chain having rollers 24 rotatably supported upon a fixed track 26, and with each link of the chain including L-shaped plates 28 having U-shaped rubber strips 30 mounted upon the short legs of the L-shaped plates 28. In this manner the carrier 10 provides a support for each strand 32 wound around the carrier 10 in the manner now to be described.

Surrounding the reaches 14 of the carriers 10 is a ring 34 rotatably mounted on rollers 36, with the ring being adapted to be rotated by means of the motor 16 operating through a gear box 38 having a speed control 40 and serving to drive a shaft 42 connected to rotate the ring 34. The ring 34 carries a plurality of spindles 44 thereon, each bearing a strand 32, the strands passing through a guide ring 46 carried with the ring 34 so that as the ring 34 is rotated at an adjustable speed by the motor 16 the strands 32 are continuously laid around the advancing reaches 14 of the carriers 10 in the form of a relatively flat helix, as seen particularly in FIGURES 2 and 3. By controlling the relative speed of the carriers 10 and the rotation of the ring 34 the angle at which the strands 32 are laid on the carriers 10 can be positioned as desired.

In order to flatten the flat helix of strands 32 into a plane-like web suitable flattening or gripping means are provided. In the embodiment of the invention illustrated these take the form of gripping means constituting two pairs of endless V-belts 50, as best seen in FIGURES 1 and 4, with each V-belt being supported in V-shaped plate members 52 forming links of endless chains indicated as a whole by the numeral 54. Each chain likewise includes guide links 56 and rollers 58 riding upon ribs or tracks 60 secured to or formed as part of plates 62. FIGURE 1 best shows that the V-belts 50 can be tightened by moving supporting pulleys 64 from the full line to the dotted line position along a support frame 66. The guide plates 62 are normally positioned in closely spaced horizontally extending positions through the apparatus, as seen in FIGURE 1, with the combined belts 50 and chains 54 being rotatably supported by members 70 during the remainder of their travel through the apparatus. Usually the chains 54 and belts 50 are adjustably driven by motor 72 driving a shaft 74 through a gear reducer 76 having a speed control 78 thereon.

It will be seen from FIGURES 1 and 2 of the drawings that the gripping belts 50 are positioned to grip the flat helix of the strands 32 at the top and bottom of the sides of the helix near the carriers 10 and to move the top and bottom sides of the helix together, as seen in FIGURE 4, so that the strands are then held in a substantially flat plane-like area between the gripping belts 50 to form a web indicated by the letter W. The strands at the edges of the web W still extend around the carriers 10 in the manner indicated by the dotted line 80 of FIGURE 4.

Now in order for the gripping belts 50 to achieve the movement of the strands 32 from the flat helix to the web W it is necessary that the carriers 10 move somewhat closer together to provide the necessary slack upon the strands to achieve the stated result. It is for this reason that the substantially parallel reaches 14 of the carriers 10 move closer together, namely from the distance D to the distance $D-x$ as best seen in FIGURE 2. As the reaches 14 move closer together in the manner described to provide the slack in the strands 32 the gripping belts 50 grip the strands to effect the action illustrated in FIGURE 4. The movement of the carriers 10 closer together is achieved by positioning the guides 26 for the carriers at a small angle to provide the necessary slack in the strands. However, the amount of slack provided is normally such that the strands at the edges of the web W are still looped, as indicated at 80 in FIGURE 4 around the carriers 10 so that considerable support is given to the web W by the carriers 10 during the movement of the web W through the remainder of the apparatus. This support given to the web means that the gripping belts 50 serve more in the nature of means for flattening the strands into the web than they do as means for gripping the ends of the strands so tightly that the strands could not be pulled out from between the V-belts 50 if the strands were cut from the carriers 10.

With the strands held in the web W and conveyed through the remainder of the apparatus various operations can be performed upon the web. For example, either a sheet of plastic can be applied to the web or longitudinal warp strands can be applied to the web, or both, as from means 81 positioned beneath the web as seen in FIGURES 1 and 2. Additionally, or alternatively, plastic can be sprayed on the web W by means of a plurality of spray heads 82 positioned across the web, again as seen in FIGURES 1 and 2. The web W with any additional means applied thereto is then normally passed through an oven 84 which will effect a curing up of any plastic applied thereto. As the web W passes out of the oven 84 knives 86 for the first time cut the edges of the web W away from the carriers 10. Shortly thereafter the gripping means 50 releases the edges of the web and the finished web is wound up on a roll 88.

FIGURE 5 illustrates that in one embodiment of the apparatus the web W may be passed between a pair of heated rolls 90 which will effect a heating together of all portions of the web W. Particularly, the heated rolls 90 can be utilized when the invention is employed with a thermoplastic sheet being applied to the web by the mechanism 80. In this latter case strands of other than thermoplastic material, for example fiberglass, can be heat embedded in the thermoplastic sheet by means of the rollers 90. When the rollers 90 are utilized in association with the web W this can be done either to replace the curing furnace 84 or to be used in conjunction with the curing furnace, and with or without the use of the plastic spray means 82.

While a certain representative embodiment and details have been shown for the purpose of illustrating the invention, it will be apparent to those skilled in this art that various changes and modifications may be made therein without departing from the spirit or scope of the invention.

What is claimed is:

1. Apparatus for making strand reinforced webs including a pair of endless carriers having opposed substantially parallel reaches, adjustable speed means for advancing the reaches, a rotary ring through which the reaches extend, a plurality of strand carrying spindles on the ring, adjustable speed means for rotating the ring to wind the strands helically around the reaches to form a web, endless pairs of V-belt means for gripping the web at the edges thereof closely adjacent the carriers and for carrying the web through the remainder of the apparatus, adjustable speed means for driving the gripping means, mounting means for the carriers positioned to move the carriers closer together just before the web is engaged by the gripping means, said gripping means including an endless chain for each V-belt, V-shaped supports on each chain link engaging the V-belt, and a fixed support on which the chain rolls, means for applying longitudinal strands to the web, means for spraying plastic on the web after gripping, oven means for drying the plastic on the web, means for cutting the web from the carriers, means for releasing the gripping means from the web, and means for winding up the web.

2. Apparatus for making strand reinforced webs including a pair of endless carriers having opposed substantially parallel reaches, adjustable speed means for advancing the reaches, a rotary ring through which the reaches extend, a plurality of strand carrying spindles on the ring, adjustable speed means for rotating the ring to wind the strands helically around the reaches to form a web, endless pairs of V-belt means for gripping the web at the edges thereof closely adjacent the carriers and for carrying the web through the remainder of the apparatus, adjustable speed means for driving the gripping means, mounting means for the carriers positioned to move the carriers closer together just before the web is engaged by the gripping means, means for spraying plastic on the web after gripping, oven means for drying the plastic on the web, means for cutting the web from the carriers, means for releasing the gripping means from the web, and means for winding up the web.

3. Apparatus for making strand reinforced webs including a pair of endless carriers having opposed substantially parallel reaches, adjustable speed means for advancing the reaches, a rotary ring through which the reaches extend, a plurality of strand carrying spindles on the ring, adjustable speed means for rotating the ring to wind the strands helically around the reaches to form a web, endless pairs of V-belt means for gripping the web at the edges thereof closely adjacent the carriers and for carrying the web through the remainder of the apparatus, adjustable speed means for driving the gripping means, mounting means for the carriers positioned to move the carriers closer together just before the web is engaged by the gripping means, means for applying plastic to the web, means for cutting the web from the carriers, means for releasing the gripping means from the web, and means for winding up the web.

4. Apparatus for making strand reinforced webs including a pair of endless carriers having opposed substantially parallel reaches, adjustable speed means for advancing the reaches, a rotary ring through which the reaches extend, a plurality of strand carrying spindles on the ring, adjustable speed means for rotating the ring to wind the strands in the form of a flat helix around the reaches, means for gripping the strands near the carriers to form the flat helix into a plane-like web over the area between the gripping means, mounting means for the carrier positioned to move the carriers a sufficient distance closer together to provide enough slack in the strands to allow the gripping means to convert the flat helix of strands to the plane-like web but with the strands at the edges of the web still extending around the carriers and supported thereby, means for connecting the overlapping strands of the web together, means for cutting the edges of the web from the carriers, means for releasing the gripping means, and means for winding up the web.

5. Apparatus for making strand reinforced webs including a pair of endless carriers having opposed substantially parallel reaches, adjustable speed means for advancing the reaches, a rotary ring through which the reaches extend, a plurality of strand carrying spindles on the ring, adjustable speed means for rotating the ring to wind the strands in the form of a flat helix around the reaches, means for gripping the strands near the carriers to form the flat helix into a plane-like web over the area between the gripping means and for retraining them in web form, mounting means for the carriers positioned to move the carriers a sufficient distance closer together to allow the gripping means to convert the flat helix of strands to the plane-like web but with the strands at the edges of the web still extending around the carriers, means for connecting the overlapping strands of the web together, means for cutting the edges of the web from the carriers, means for releasing the gripping means, and means for winding up the web.

6. Apparatus for making strand reinforced webs including a pair of endless carriers having opposed substantially parallel reaches, adjustable speed means for advancing the reaches, a rotary ring through which the reaches extend, a plurality of strand carrying spindles on the ring, adjustable speed means for rotating the ring to wind the strands in the form of a flat helix around the reaches, endless belt means for gripping the strands near the carriers to form the flat helix into a plane-like web over the area between the gripping means and for moving with the strands, mounting means for the carriers positioned to move the carriers a sufficient distance closer together to allow the gripping means to convert the flat helix of strands to the plane-like web but with the strands at the edges of the web still extending around the carriers, means for connecting the overlapping strands of the web together, means for releasing the web from the carriers and the gripping means, and means for winding up the web.

7. Apparatus for making webs reinforced with angularly directed strands including a pair of substantially parallel carriers, means for advancing the carriers, means for helically winding strands around the carriers to form a flat helix of strands, endless belt-type flattening means adjacent the carriers for forming the helix between the flattening means into a plane-like web of strands with the strands at the edges of the web still extending around the carriers, means positioning the flattening means for movement with the strands, means for connecting the strands in the web, means for removing the web from the carriers, and means for winding up the web.

References Cited
UNITED STATES PATENTS

| | | | |
|---|---|---|---|
| 2,429,177 | 10/1947 | Young | 156—496 X |
| 2,782,458 | 2/1957 | Emmert et al. | 156—496 X |
| 2,954,816 | 10/1960 | Havemann | 156—427 X |
| 2,954,817 | 10/1960 | Havemann | 156—427 X |
| 3,041,230 | 6/1962 | Diehl | 156—439 X |
| 3,149,014 | 9/1964 | Havemann | 156—439 X |
| 3,169,087 | 2/1965 | Van Ness et al. | 156—431 |

EARL M. BERGERT, *Primary Examiner.*

J. P. MELOCHE, *Assistant Examiner.*